Nov. 28, 1961  L. C. CRUMRINE, JR., ET AL  3,010,238
FISHING DEVICE
Filed April 14, 1958
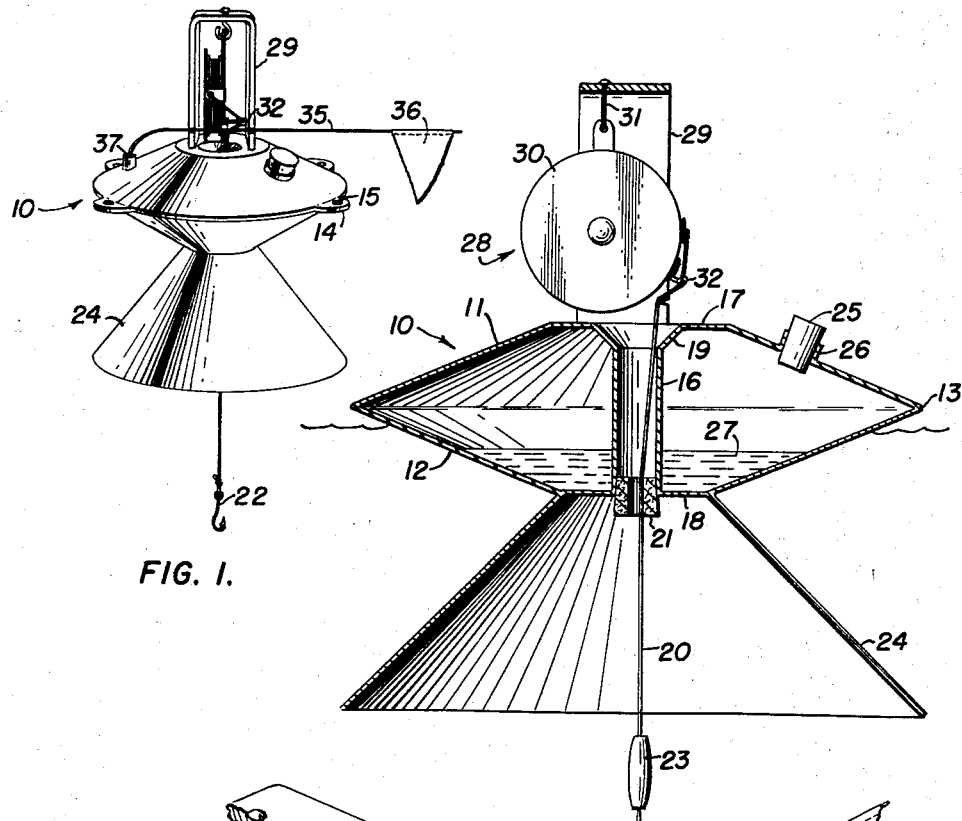
FIG. 1.
FIG. 2.
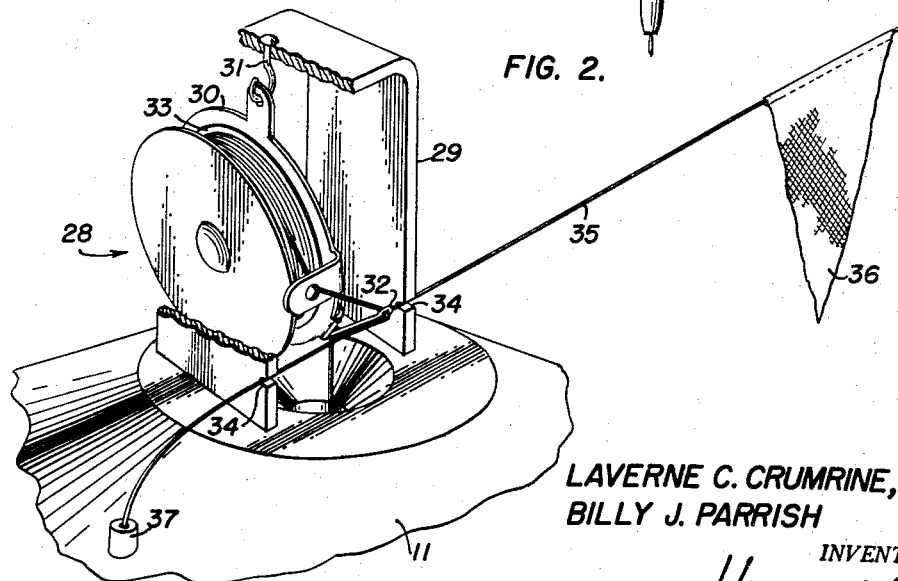
FIG. 3.
LAVERNE C. CRUMRINE, JR.
BILLY J. PARRISH
INVENTORS
BY *Herbert J. Brown*
ATTORNEY

United States Patent Office 3,010,238
Patented Nov. 28, 1961

3,010,238
FISHING DEVICE
Laverne C. Crumrine, Jr., Fort Worth, and
Billy J. Parrish, Smithfield, Tex.
Filed Apr. 14, 1958, Ser. No. 728,266
1 Claim. (Cl. 43—16)

This invention relates to fishing devices and has reference to a combined automatic reel and float.

An object of the invention is to provide a floating fishing device capable of drifting over large areas of water, thus giving the bait greater movement as compared with casting or pole fishing.

Another object is to provide a float capable of selective buoyancy for the described purpose.

A particular object is to provide a funnel shaped skirt or base in a combined float and automatic reel for stabilizing the movement of the float in the water and for discouraging movement of the fish after it is caught.

A further object is to provide a float and automatic reel capable of protecting the user from the fish hook and protecting the barb of the fish hook from damage against metal parts.

In the accompanying drawings:

FIGURE 1 is a perspective view of a combined automatic fishing reel and float embodying the features of the invention.

FIGURE 2 is an enlarged vertical sectional view of the device illustrated in FIGURE 1.

FIGURE 3 is a further enlarged view, the same being a broken perspective view showing an automatic reel mounted on a float in accordance with the invention.

The float 10 of the invention is comprised of upper and lower portions 11 and 12 in the form of truncated hollow cones integrally joined at their base peripheries, as at 13. Ears 14 having holes 15 therethrough may be provided around the circumference of the float 10 for attaching a tie line, not shown. A tube 16 extends through the axial centers of the upper and lower circular surfaces 17 and 18 of the float 10, the upper end of which tube is flared, as at 19. The tube 16 accommodates a fishing line 20 therethrough and to that end includes a tubular resilient guide 21 in its lower end. A hook 22 and weight 23 are connected to the line 20 in the usual manner.

A feature of the invention has to do with a funnel shaped skirt or base 24, open at its lower end, and secured to the periphery of the circular flat portion 18 comprising the bottom of the float 10. The base 24 not only maintains the float 10 in an upright position, but at least partly covers the fish when caught and thus tends to prevent tangling of lines. Moreover, it is believed that a fish drawn into the funnel shaped base will be less likely to fight after being caught. There is a stopper 25 in an opening 26 in the upper portion 17 of the float for varying the amount of water 27 contained within the float 10 and whereby the depth of the float in the surrounding water may be varied.

In combination with the described float 10, there is a conventional automatic reel 28 suspended over the upper end of the tube 16 by means of an inverted U bracket 29 secured to the upper surface portion 17. Since the reel 28 is conventional and may be purchased on the open market, details of the same are not herein described in detail; however, it is pointed out that the reel includes a circular supporting plate 30 connected with the upper center of the bracket 29 by means of a swivel hook 31, and that the reel includes an angularly disposed pivoted trigger arm through which the fishing line 20 is threaded prior to engagement on the spring loaded reel 33. Notches 34 are located in corresponding sides of the bracket 29 below the level of the pivoted trigger arm 32, and which notches detachably receive a normally vertical spring wire 35 having a signal, such as a flag 36, on the extending end thereof. The base end of the wire 37 is secured in the surface of the float 10 a distance from the bracket 29, but in line with the notched sides thereof.

In operation, the hook 22 is baited and line 20 is reeled out the desired length, after which the trigger arm 32 is set and the spring wire 35 is engaged in the notches 34. The angularly disposed trigger arm 32 is in contact with the spring wire 35; thus, when a fish is caught the action of the line 20 causes the trigger arm to disengage the spring wire 35 in the notches 34. At the same time, the automatic reel draws the caught fish upwardly and at least partially into the funnel skirt 24. The fisherman knows of the catch by reason of the erect position of the signal 36 and then, by boat, recovers the described floating device.

The invention is not limited to the exemplary construction herein shown and described, but may be varied within the scope of the appended claim.

What is claimed is:

A fishing device comprising a hollow float, a tube extending through the vertical axis of said float, a stopper in said float for admitting selective amounts of liquids therein, an automatic fishing reel and line thereon above said float, means suspending said reel above said float, said reel including a trigger arm, a normally vertical spring wire secured at one end of said float, a signal on the free end of said wire, the line of said reel being slidably positioned through said trigger arm, means detachably securing said wire in a bent position and contacting the line of said reel at a location adjacent said arm, said line extending from said reel through said tube, and a funnel shaped skirt secured to said float and around the lower end of said tube, said skirt depending relative to the lower end of said tube and of a size to at least partially receive a fish caught on said line when said reel is triggered.

References Cited in the file of this patent

UNITED STATES PATENTS

| 2,523,927 | Stallings | Sept. 26, 1950 |
| 2,577,555 | White | Dec. 4, 1951 |
| 2,600,797 | Neef | June 17, 1952 |
| 2,606,385 | Laurito | Aug. 12, 1952 |
| 2,653,405 | Monahan | Sept. 29, 1953 |
| 2,818,671 | Crouch | Jan. 7, 1958 |

FOREIGN PATENTS

| 86,160 | Austria | Nov. 10, 1921 |
| 800,685 | France | May 11, 1936 |
| 303,589 | Switzerland | Feb. 16, 1955 |